Dec. 29, 1970     E. L. HELTON     3,550,293
LOADER BUCKET CUTTING EDGE
Filed July 23, 1968     2 Sheets-Sheet 1
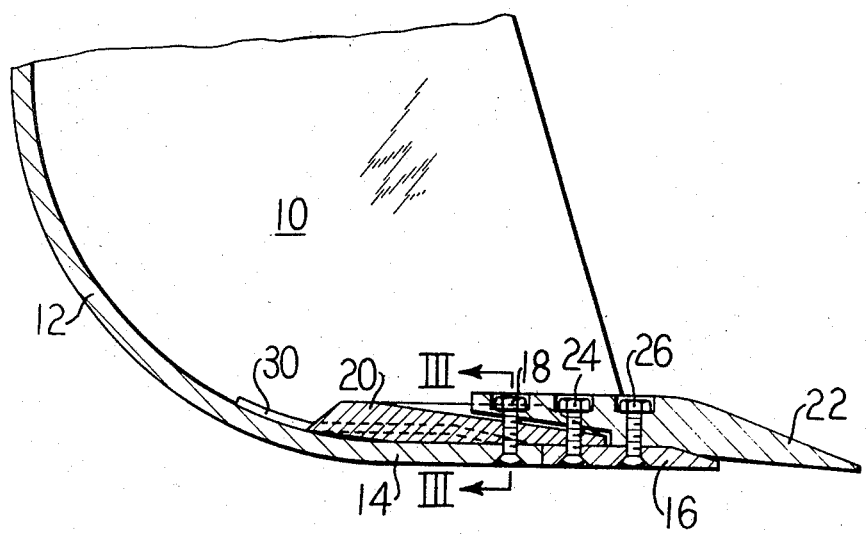
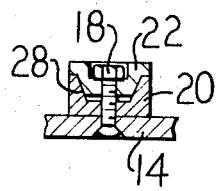
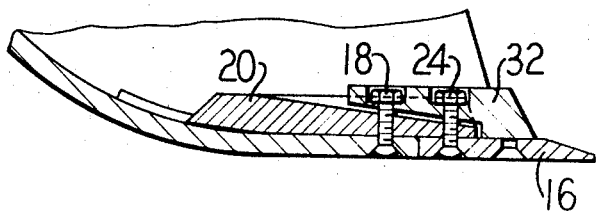
INVENTORS
EUGENE L. HELTON
BY
ATTORNEYS

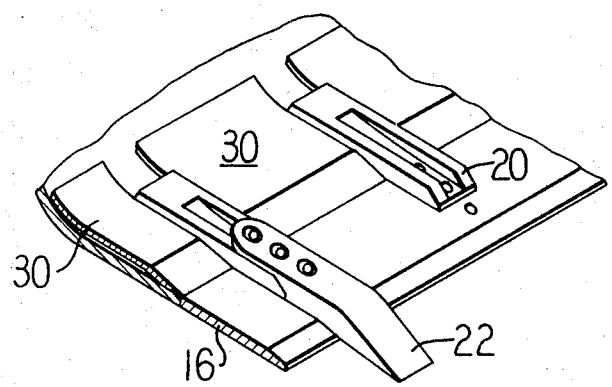
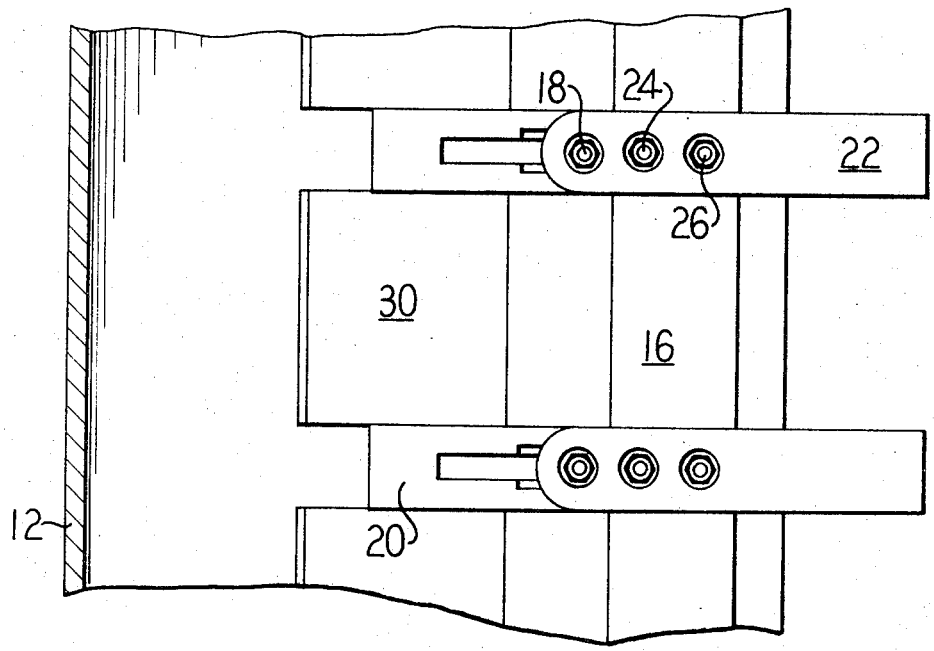

3,550,293
LOADER BUCKET CUTTING EDGE
Eugene L. Helton, Peoria, Ill., assignor to Caterpillar Tractor Co., Peoria, Ill., a corporation of California
Filed July 23, 1968, Ser. No. 746,940
Int. Cl. E02f 9/28
U.S. Cl. 37—141      3 Claims

ABSTRACT OF THE DISCLOSURE

A cutting edge for a loader bucket which is bolted in place with respect to the bottom of the bucket and with which spaced bars support cutting teeth which are secured in place by the same bolts that secure the cutting edge and some of which bolts also extend through the spaced bars and the bottom of the bucket.

---

Most bucket loaders presently available have buckets with cutting edges welded to the floor of the bucket. When it is necessary to replace the cutting edge the worn edge is first cut out of the bucket with a torch and a new hardened edge is then welded back into place at the leading edge of the bucket floor. The removal and replacement of a cutting edge by this method requires several hours and it increases the cost of replacing the cutting edge as compared to simply bolting a new edge in place. It is necessary to replace bucket edges quite frequently when the bucket is used in handling of abrasive substances as is often the case in mines and quarries.

It is the object of the present invention to provide a readily replacable bucket edge which is combined with replaceable teth and with reinforcing means which make it very durable as well as easily replaceable at the end of its useful life.

Further objects and advantages of the invention and the manner in which they are carried into practice are made apparent in the following specifications wherein reference is made to the accompanying drawings.

In the drawings:

FIG. 1 is a vertical sectional view through the forward lower portion of a bucket, the cutting edge and teeth of which are constructed and assembled in accordance with the present invention;

FIG. 2 is a fragmentary view showing the cutting edge of FIG. 1 with an adapter which replaces the teeth when they are not used;

FIG. 3 is a sectional view on the line III—III of FIG. 1;

FIG. 4 is a fragmentary perspective view showing a portion of the cutting edge and showing one adapter with a tooth and one adapter without; and FIG. 5 is a fragmentary plan view looking down on a portion of the bottom of the bucket showing the cutting edge with two adapters and two teeth in place.

Referring first to FIG. 1 of the drawings a portion of a bucket is shown as having a side wall 10 of which there are two, a back wall 12 and a bottom wall 14. As is customary, the forward edge of the bottom wall 14 has a hardened cutting edge 16. In the present case, the cutting edge 16 is secured in place by groups of three bolts, there being one bolt 18 in each group which passes through the bottom of the bucket and through a tooth support bar 20 and a hardened tooth 22. The teeth and support bars are spaced through the width of the bucket and cutting edge. A second bolt 24 passes through the hardened cutting edge, the support bar and the supporting or attaching portion of tooth 22, and a third bolt 26 passes through the cutting edge and the tooth.

The tooth support bars are welded in place at spaced intervals to project forwardly over the forward edge of the bottom of the bucket and have grooves with downwardly converging walls which, as shown in FIG. 3, receive complementary walls on the tooth in a tapered joint shown at 28. Also, welded to the bottom of the bucket in the spaces between the support bars 20 are plates 30 best shown in FIG. 4 shaped to conform to the bottom of the bucket and filling the spaces between the support bars to aid in preventing collection of earth or other material in the spaces and also to add to the rigidity of the support bars and the teeth.

For the handling of certain materials, teeth which project forwardly of the cutting edge of the bucket are considered unnecessary in which case the present invention provides adapters or removable support means 32, as best shown in FIG. 2 which fit within the tapered grooves of the support bars in the same manner as the teeth but are terminated short of the leading portion of the cutting edge. With this assembly, the forward bolt 26 may be omitted.

What is claimed is:

1. In a loader bucket having a bottom wall and a removable cutting edge disposed forwardly thereof, means to hold the cutting edge in place, said means comprising:
   spaced support bars secured to the bottom wall and extending forwardly thereof;
   a groove formed in the upper surface of each of said support bars;
   removable support means mounted in said groove and engaging the upper surface of said cutting edge;
   a first set of bolts extending through the support bars, the bottom wall, and the removable support means;
   another set of bolts extending through the support bars, the cutting edge, the removable support means and operative to clamp said cutting edge to said support bars.

2. The combination of claim 1 wherein said removable support means includes a tooth extending forwardly beyond said cutting edge.

3. The combination of claim 1 with reinforcing plates welded to the bottom wall between the support bars.

References Cited

UNITED STATES PATENTS

| | | | |
|---|---|---|---|
| 508,685 | 11/1893 | Davy | 37—141 |
| 846,278 | 5/1907 | Bagley | 37—141X |
| 872,439 | 12/1907 | Livengood | 37—141 |
| 1,757,328 | 5/1930 | Mullally | 37—141 |
| 1,769,998 | 7/1930 | Jenkins | 37—141 |
| 1,843,205 | 2/1932 | Clark | 37—141 |
| 2,105,320 | 1/1938 | Heil | 37—141 |
| 2,828,558 | 4/1958 | Reinhard | 37—141 |
| 3,029,534 | 4/1962 | Rakisits | 37—141 |
| 3,456,370 | 7/1969 | Gilbertson | 37—141 |

EDGAR S. BURR, Primary Examiner

U.S. Cl. X.R.

37—142